US010253151B2

(12) United States Patent
Mukaiyama (10) Patent No.: US 10,253,151 B2
(45) Date of Patent: Apr. 9, 2019

(54) PHENOLIC RESIN FOAM AND METHOD FOR PRODUCING THE SAME

(71) Applicant: ASAHI KASEI CONSTRUCTION MATERIALS CORPORATION, Tokyo (JP)

(72) Inventor: Shigemi Mukaiyama, Tokyo (JP)

(73) Assignee: ASAHI KASEI CONSTRUCTION MATERIALS CORPORATION, Tokyo (JP)

( * ) Notice: Subject to any disclaimer, the term of this patent is extended or adjusted under 35 U.S.C. 154(b) by 0 days.

(21) Appl. No.: 14/651,161

(22) PCT Filed: Dec. 10, 2013

(86) PCT No.: PCT/JP2013/083104
§ 371 (c)(1),
(2) Date: Jun. 10, 2015

(87) PCT Pub. No.: WO2014/092086
PCT Pub. Date: Jun. 19, 2014

(65) Prior Publication Data
US 2015/0329690 A1    Nov. 19, 2015

(30) Foreign Application Priority Data

Dec. 11, 2012  (JP) ................................ 2012-270019

(51) Int. Cl.
| C08G 8/10 | (2006.01) |
| C08J 9/00 | (2006.01) |
| C08J 9/14 | (2006.01) |

(52) U.S. Cl.
CPC ............... *C08J 9/141* (2013.01); *C08G 8/10* (2013.01); *C08J 9/0061* (2013.01); *C08J 2203/14* (2013.01); *C08J 2203/182* (2013.01); *C08J 2205/052* (2013.01); *C08J 2361/10* (2013.01)

(58) Field of Classification Search
CPC ......... C08G 8/10; C08J 9/141; C08J 2203/14; C08J 2361/19
See application file for complete search history.

(56) References Cited

U.S. PATENT DOCUMENTS

| 6,476,090 B1 | 11/2002 | Arito et al. |
| 2011/0263731 A1 | 10/2011 | Kitagawa et al. |
| 2012/0270026 A1* | 10/2012 | Mihori ................ C08J 9/141 428/220 |
| 2013/0011655 A1* | 1/2013 | Hamajima ............ B32B 5/20 428/304.4 |
| 2013/0288038 A1 | 10/2013 | Mihori et al. |
| 2015/0329690 A1 | 11/2015 | Mukaiyama |

FOREIGN PATENT DOCUMENTS

| CN | 1307607 A | 8/2001 |
| EP | 1095970 A1 | 5/2001 |
| JP | 7-103640 A | 4/1995 |
| JP | 11-140216 A | 5/1999 |
| JP | 11-140217 A | 5/1999 |
| JP | 2002-338784 A | 11/2002 |
| JP | 2005-8668 A | 1/2005 |
| JP | 3813062 B2 | 8/2006 |
| JP | 2006-328293 A | 12/2006 |
| JP | 2007-70512 A | 3/2007 |
| JP | 2008-24868 A | 2/2008 |
| KR | 10-2001-0053372 A | 6/2001 |
| KR | 10-2011-0043739 A | 4/2011 |
| WO | WO 00/01761 A1 | 1/2000 |
| WO | WO 2007/029222 A1 | 3/2007 |
| WO | WO 2012/053493 A1 | 4/2012 |
| WO | WO 2014/092086 A1 | 6/2014 |

OTHER PUBLICATIONS

Search Report issued in the corresponding European Patent Application No. 13861717.0 dated Oct. 23, 2015.
International Search Report, issued in PCT/JP2013/083104, dated Feb. 25, 2014.
The International Preliminary Report on Patentability along with an English translation of the Written Opinion of the International Searching Authority issued in the corresponding International Application No. PCT/JP2013/083104 dated Jun. 25, 2015.

* cited by examiner

*Primary Examiner* — Melissa A Rioja
(74) *Attorney, Agent, or Firm* — Birch, Stewart, Kolasch & Birch, LLP (57) ABSTRACT

The present invention is a phenolic resin foam including a hydrocarbon having a carbon number of 6 or less and a density of the phenolic resin foam is 10 kg/m$^3$ or more and 150 kg/m$^3$ or less, in which, in the phenolic resin foam, the hydrocarbon having a carbon number of 6 or less includes 40 mol % to 90 mol % of cyclopentane and 60 mol % to 10 mol % of one or two or more types selected from hydrocarbons having a boiling point of −50° C. to 5° C.; and the average boiling point X of the hydrocarbon having a carbon number of 6 or less is 5° C. to 44° C. and the content Y of the hydrocarbon having a carbon number of 6 or less in the phenolic resin foam is 0.25 mol to 0.9 mol per of 22.4×10$^{-3}$ m$^3$ space volume in the phenolic resin foam.

11 Claims, 2 Drawing Sheets

PHENOLIC RESIN FOAM AND METHOD FOR PRODUCING THE SAME

TECHNICAL FIELD

The present invention relates to a phenolic resin foam having an excellent thermal conductivity and used for a thermal-insulating material for construction, a thermal-insulating material for vehicles, and a thermal-insulating material for device and a method for producing the same.

BACKGROUND ART

A phenolic resin foam used as a thermal-insulating material can provide required thermal insulation performance in a thinner thickness as the phenolic resin foam has lower thermal conductivity, thereby reducing the amount of the thermal-insulating material used and reducing space required for construction. In a residential house, for example, a wider effective living space can be secured to the construction area of the residential house.

In addition, once the residential house is constructed, the residential house is used for a long period and thus high thermal insulation performance should be maintained for a long period.

In recent years, long-term quality housing has been required more and more because of energy saving and resource saving and thus the high thermal insulation performance and retention of initial low thermal conductivity for a longer period are required more than ever before.

Patent Literature 1 discloses a phenolic resin foam characterized in that the foam has 5% or less of the area ratio of voids relative to the cross-sectional area of the foam and in which holes do not substantially exist in a cell wall. The phenolic resin foam, however, has insufficient initial thermal conductivity and a change rate in aged thermal conductivity.

Patent Literature 2 discloses a foamable phenolic resole resin composition characterized in containing a foaming agent including cyclopentane as a main component and a partial hydrolysis-condensation product of an organic silicon compound having a hydrolyzable group. The foamed phenolic resin foam, however, has high initial thermal conductivity and large increase in aged thermal conductivity.

Patent Literature 3 discloses a phenolic resin foam characterized in containing a filler selected from a metal hydroxide, a metal oxide, a metal carbonate, and a metal powder and having a pH of 5 or more. The phenolic resin foam, however, has high initial thermal conductivity and large increase in aged thermal conductivity.

Patent Document 4 discloses a phenolic resin foam characterized in that the foam has a uniform fine cell structure in which the standard deviation of a cell diameter distribution is 7% or less of an average cell diameter and the area ratio of voids existing in the cross-sectional area of the foam is 0.5% or less, and in which holes do not exist in a cell wall. The phenolic resin foam, however, has insufficient initial thermal conductivity and the change rate in aged thermal conductivity.

CITATION LIST

Patent Literature

[Patent Literature 1] Japanese Patent No. 3813062
[Patent Literature 2] Japanese Patent Application Laid-Open Publication No. 2002-338784
[Patent Literature 3] Japanese Patent Application Laid-Open Publication No. 2007-70512
[Patent Literature 4] Japanese Patent Application Laid-Open Publication No. 2008-24868

SUMMARY OF INVENTION

Technical Problem

The present invention has a purpose of providing a phenolic resin foam having low initial thermal conductivity and retaining low thermal conductivity for a long period and a method for producing the same.

Solution to Problem

As a result of extensive research in order to solve the above problems, the inventors of the present invention have found that the low initial thermal conductivity and the retention of the low thermal conductivity for a long period of a phenolic resin foam can be achieved by determining a foaming agent existing in the phenolic resin foam in a specific composition range and determining the amount of the foaming agent existing in the foam in a specific range and have accomplished the present invention.

Namely, the present invention is as described below.

(i) A phenolic resin foam comprising a hydrocarbon having a carbon number of 6 or less and having a density of 10 kg/m$^3$ or more and 150 kg/m$^3$ or less, wherein in the phenolic resin foam, the hydrocarbon having a carbon number of 6 or less includes 40 mol % to 90 mol % of cyclopentane and 60 mol % to 10 mol % of one or two or more types selected from hydrocarbons having a boiling point of $-50°$ C. to $5°$ C., and the average boiling point X of the hydrocarbon having a carbon number of 6 or less is $5°$ C. to $44°$ C. and the Y of the hydrocarbon having a carbon number of 6 or less in the phenolic resin foam is 0.25 mol to 0.9 mol per of 22.4×10$^{-3}$ m$^3$ space volume in the phenolic resin foam.

(ii) The phenolic resin foam according to (i), wherein the coefficient Z calculated from X and Y by the following equation (1):

$$Z=0.0063X+Y \quad (1)$$

is 0.40 or more and 1.10 or less.

(iii) The phenolic resin foam according to (i) or (ii), wherein
both thermal conductivities measured at 10° C. and 23° C. of the phenolic resin foam are less than 0.0205 W/m·K.

(iv) The phenolic resin foam according to any one of (i) to (iii), having:
a closed cell ratio of 90% or more;
an average cell diameter of 40 μm or more and 300 μm or less; and
a void area ratio of 0.2% or less.

(v) The phenolic resin foam according to any one of (i) to (iv), wherein the hydrocarbon having a boiling point of $-50°$ C. to $5°$ C. contains isobutane.

(vi) The phenolic resin foam according to any one of (i) to (v), wherein the total amount of cyclopentane and the hydrocarbon having a boiling point of $-50°$ C. to $5°$ C. among substances having a boiling point of $-100°$ C. to $81°$ C. contained in the phenolic resin foam is 70 mol % to 100 mol %.

(vii) The phenolic resin foam according to any one of (i) to (vi), wherein the total content of compounds having reactivity with an acid curing catalyst or compounds that alters by the acid curing catalyst is 0.5% by weight or less relative to the phenolic resin foam.

(viii) A method for producing the phenolic resin foam according to any one of (i) to (vii), comprising:

mixing a foamable phenolic resin composition containing a phenolic resin, a surfactant, a foaming agent including cyclopentane and a hydrocarbon having a boiling point of −50° C. to 5° C., and an acid curing catalyst with a mixing machine;

discharging the foamable phenolic resin composition from a distribution part of the mixing machine; and then pressurizing the foamable phenolic resin composition from upper direction and lower direction in a process of foaming and curing the foamable phenolic resin composition by heating to produce a phenolic resin foam molded in the form of a plate.

(ix) The method according to (viii), wherein the pressure of the distribution part is 0.3 MPa or more and 10 MPa or less.

(x) The method according to (viii) or (ix), wherein the content of water contained in the foamable phenolic resin composition to be charged into the mixing machine is 2% by weight to 20% by weight, and the temperature in a double conveyor used during foaming and curing is 60° C. to 100° C.

(xi) The method according to any one of (viii) to (x), wherein the coefficient R calculated from the content of water P (% by weight) and the temperature Q (° C.) in the double conveyor by the following equation (2):

$$R = P + 0.2286Q \quad (2)$$

is 20 or more and 36 or less.

Advantageous Effects of Invention

According to the present invention, a phenolic resin foam having low initial thermal conductivity and retention of low thermal conductivity for a long period and a method for producing the same can be provided. Therefore, the phenolic resin foam of the present invention can be preferably used for a thermal-insulating material for construction, a thermal-insulating material for vehicles, and a thermal-insulating material for devices.

DESCRIPTION OF EMBODIMENTS

Hereinafter, an embodiment for carrying out the present invention (hereinafter, referred to as "this embodiment") will be described in detail. The present invention, however, is not limited to the following embodiment, and various changes or modifications may be made within the scope of the invention.

The phenolic resin foam in this embodiment is a phenolic resin foam having a density of 10 kg/m$^3$ or more and 150 kg/m$^3$ or less and preferably 15 kg/m$^3$ or more and 70 kg/m$^3$ or less. When the density is excessively low, the foam is weak in strength and difficult to handle. In addition, as cell walls are thin, the foaming agent in the foam may tend to be easily replaced to air and long term thermal insulation performance may tend to easily deteriorate. When the density is excessively high, the thermal conductivity of a resin part forming cell walls may become larger and thus the thermal insulation performance may tend to deteriorate.

The phenolic resin foam of this embodiment includes the hydrocarbon having a carbon number of 6 or less. The hydrocarbon is mainly used as a foaming agent for producing the phenolic resin foam having the above density. The hydrocarbon in this embodiment is a compound constituted by hydrogen atoms and carbon atoms only. Examples of the hydrocarbon having a carbon number of 6 or less include aliphatic hydrocarbons of alkanes, alkenes, and dienes such as methane, ethane, ethylene, propane, propylene, butane, butene, butadiene, pentane, pentene, hexane, and hexene and cyclic aliphatic hydrocarbons of cycloalkanes and cycloalkenes such as cyclobutane, cyclopentane, and cyclohexane.

The phenolic resin foam of this embodiment is characterized in that the hydrocarbon composition having a carbon number of 6 or less contained in the foam satisfies the following conditions.

(1) The hydrocarbon composition contains cyclopentane.

(2) In addition to (1), the hydrocarbon composition contains one or two or more of hydrocarbons selected from hydrocarbons having a boiling point in a range of −50° C. to 5° C.

(3) As each ratio of (1) and (2) relative to the total amount of the hydrocarbon having a carbon number of 6 or less, cyclopentane is 40 mol % to 90 mol % and the total amount of one or two or more hydrocarbons selected from hydrocarbons having a boiling point of −50° C. to 5° C. is 60 mol % to 10 mol %.

The composition in which cyclopentane is 50 mol % to 85 mol % and the total amount of one or two or more hydrocarbons selected from hydrocarbons having a boiling point of −50° C. to 5° C. is 50 mol % to 15 mol % is more preferable and a composition in which cyclopentane is 65 to 80 mol % and the total amount of one or two or more hydrocarbons selected from hydrocarbons having a boiling point of −50° C. to 5° C. is 35 mol % to 20 mol % is particularly preferable.

In order to improve the thermal insulation performance, cyclopentane is required to be contained in the phenolic resin foam of this embodiment. When the content of cyclopentane is excessively low, initial thermal insulation performance at 23° C. and long term thermal insulation performance tend to deteriorate. When the content of cyclopentane is excessively high, the initial thermal insulation performance at 10° C. tends to deteriorate. The inventors of the present invention, however, have found that the initial thermal insulation performance at 10° C. and the long term thermal insulation performance can be improved by containing hydrocarbon having a boiling point of −50° C. to 5° C. in a specific amount.

Examples of the hydrocarbon having a boiling point of −50° C. to 5° C. include propane, propylene, isobutane, normal-butane, 1-butene, cis-2-butene, trans-2-butene, 2-methylpropene, and butadiene. Propane, normal-butane and isobutane are preferable and isobutane is particularly preferable from the viewpoint of thermal conductivity and stability.

The phenolic resin foam in this embodiment is characterized in that the hydrocarbon having a carbon number of 6 or less contained in the foam has the average value of the boiling point calculated by the following equation (3) of 5° C. to 44° C. The average value is preferably 10° C. to 40° C. and more preferably 15° C. to 37° C. When the average value of the boiling point is excessively low, the thermal conductivity of mixed gas tends to be high and thus the initial thermal insulation performance at 23° C. tends to deteriorate. In addition, long term thermal insulation performance may also tend to deteriorate because the content of cyclopentane that is difficult to be released from the inside of cells decreases. When the average value of the boiling point is excessively high, the initial thermal insulation performance at 10° C. may tend to deteriorate because the hydrocarbon is easily liquefied at lower temperature.

$$X = a \times Ta + b \times Tb + c \times Tc + \quad (3)$$

In the above equation, types of contained hydrocarbons are A, B, C, and the like and each content is a, b, c, and the like (molar fraction), and boiling points are Ta, Tb, Tc, and the like (° C.).

The content Y of the hydrocarbon having a carbon number of 6 or less in the phenolic resin foam of this embodiment is 0.25 mol to 0.9 mol, preferably 0.3 mol to 0.8 mol, and more preferably 0.35 mol to 0.7 mol to the space volume in the foam of $22.4 \times 10^{-3}$ m$^3$ (22.4 L). When the content of the hydrocarbon having a carbon number of 6 or less is excessively low, the long term thermal insulation performance may be easy to deteriorate, whereas when the content is excessively high, the initial thermal insulation performances at 10° C. and 23° C. may tend to deteriorate.

In the phenolic resin foam in this embodiment, the coefficient Z calculated from the average boiling point X of the hydrocarbon having a carbon number of 6 or less and the hydrocarbon content Y of the hydrocarbon having a carbon number of 6 or less by the following equation (4):

$$Z = 0.0063 \times X + Y \quad (4)$$

is preferably 0.40 or more and 1.10 or less, more preferably 0.55 or more and 0.95 or less, and particularly preferably 0.6 or more and 0.85 or less.

When the value of the coefficient Z is excessively small, the long term thermal insulation performance may be easy to deteriorate because the amount of the hydrocarbon having good thermal insulation performance is small, whereas when the coefficient Z is excessively large, the included hydrocarbon is easy to be liquefied and thus the initial thermal insulation performances at 10° C. and 23° C. may tend to deteriorate.

The phenolic resin foam in this embodiment may include inorganic gasses such as carbon dioxide gas, nitrogen, oxygen, helium, and argon; ethers such as dimethyl ether, diethyl ether, methyl ethyl ether, and furan; ketones such as acetone and methyl ethyl ketone; halogenated hydrocarbons such as methyl chloride, methylene chloride, ethyl chloride, 2-chloropropane, 1,1,1,2-tetrafluoroethane, 1,1-difluoroethane, 1-chloro-1,1-difluoroethane, 1,1,1-trifluoroethane, dichlorodifluoromethane, 1,2-dichlorotetrafluoroethane, and monochlorotrifluoroethane. However, when substances having foamability and volatility are included in a large amount in addition to the above hydrocarbons, the initial thermal insulation performance and the long term thermal insulation performance may deteriorate. Therefore, the total amount of cyclopentane and the hydrocarbon having a boiling point of −50° C. to 5° C. among substances having a boiling point of −100° C. to 81° C. contained in the foam measured in a method described below is preferably 70 mol % or more and 100 mol % or less, more preferably 90 mol % or more and 100 mol % or less, and particularly preferably 95 mol % or more and 100 mol % or less.

In the phenolic resin foam in this embodiment, both thermal conductivities measured at 10° C. and 23° C. described below are preferably less than 0.0205 W/m·K and both thermal conductivities measured at 10° C. and 23° C. are more preferably less than 0.0195 W/m·K. Both thermal conductivities are further preferably less than 0.0189 W/m·K and particularly preferably less than 0.0185 W/m·K. Generally, the thermal conductivity of the thermal-insulating material tends to be better as the temperature becomes lower and thus the thermal conductivity measured at 10° C. described below is preferably less than 0.0190 W/m·K, more preferably less than 0.0185 W/m·K, further preferably less than 0.0180 W/m·K, and particularly preferably less than 0.0175 W/m·K. Together with the thermal conductivities measured at 10° C. and 23° C., worsen (raised) thermal conductivity ((Acceleration-tested thermal conductivity after)−(Initial thermal conductivity)) subtracting the initial thermal conductivity before the acceleration test from the acceleration-tested thermal conductivity is preferably 0.0020 W/m·K or less, more preferably 0.0010 W/m·K or less, further preferably 0.0005 W/m·K or less, and particularly preferably 0.0003 W/m·K or less. Such the phenolic resin foam having the thermal conductivity described above shows excellent thermal insulation performance at either normal temperature or low temperature and maintains the excellent thermal insulation performance for a long period. This phenolic resin foam is thus preferable.

A low closed cell ratio of the phenolic resin foam in this embodiment tends to easily cause deterioration in the thermal insulation performance over time and thus the ratio is preferably 90% or more, more preferably 95% or more, and particularly preferably 98% or more and 100% or less.

When the average cell diameter of the phenolic resin foam in this embodiment is excessively small, strength may deteriorate and deterioration in the thermal insulation performance over time tends to easily occur, whereas when the average cell diameter is excessively large, the initial thermal insulation performance tends to worsen. Therefore, the average cell diameter is preferably 40 μm or more and 300 μm or less, more preferably 50 μm or more and 200 μm or less, and particularly preferably 60 μm or more and 150 μm or less.

As described above, the average cell diameter of the phenolic resin foam in this embodiment is 40 μm or more and 300 μm or less. However, pores having large diameter called voids may partially exist. When a void area ratio is excessively large, the initial thermal insulation performance tends to worsen and deterioration in the thermal insulation performance over time tends to easily occur. Therefore, the void area ratio is preferably 0.2% or less and more preferably 0.1% or less. In this embodiment, a pore having an area of 2 mm$^2$ or more is defined as the void. The ratio of the area in which the pores (voids) having an area of 2 mm$^2$ or more exist in the cutting cross-sectional surface obtained by cutting a substantially center part of the phenolic resin foam in a thickness direction in parallel with the front and back surfaces is defined as the void area ratio.

The phenolic resin foam in this embodiment may contain an inorganic fine powder and/or an organic fine powder. These fine powders preferably are unreactive with an acid curing catalyst described below. When the phenolic resin foam contains the inorganic fine powder, such as aluminum hydroxide, talc, silicon oxide, glass powder, and titanium oxide, that is unreactive with an acid curing catalyst, the initial thermal insulation performance tends to be improved. When the amount of the inorganic fine powder is excessively high, the initial thermal conductivity tends to worsen and deterioration in the thermal insulation performance over time tends to easily occur. Consequently, the inorganic fine powder unreactive with the acid curing catalyst is preferably contained in an amount of 0.1% by weight to 35% by weight and more preferably 1% by weight to 20% by weight, and particularly preferably 2% by weight to 15% by weight relative to the phenolic resin foam. The particle diameter of the inorganic fine powder unreactive with the acid curing catalyst is preferably 0.5 μm to 500 μm, further preferably 2 μm to 100 μm, and particularly preferably 5 μm to 50 μm. Among the inorganic fine powders unreactive with the acid curing catalyst, aluminum hydroxide is particularly preferable.

When the phenolic resin foam contains an inorganic fine powder of a metal hydroxide, a metal oxide, a metal carbonate, and a metal powder such as aluminum oxide, zinc oxide, magnesium hydroxide, calcium carbonate, magnesium carbonate, barium carbonate, and zinc carbonate that is reactive with the acid curing catalyst described below, deterioration in the thermal insulation performance over time tends to easily occur. Consequently, the inorganic fine powder reactive with the acid curing catalyst is preferably not contained in the phenolic resin foam.

When the phenolic resin foam contains the organic fine powder such as a fluorine resin fine powder, a polypropylene fine powder, and a phenolic resin foam powder unreactive with the acid curing catalyst, the initial thermal insulation performance tends to be improved. When the amount of the contained fine powder is excessively large, deterioration in the thermal insulation performance over time tends to easily occur. Consequently, the content of the organic fine powder unreactive with the acid curing catalyst is preferably 0.1% by weight to 35% by weight, more preferably 0.5% by weight to 20% by weight, and particularly preferably 1% by weight to 10% by weight relative to the phenolic resin foam. The average particle diameter of the organic fine powder unreactive with the acid curing catalyst is preferably 0.5 μm to 2000 μm, further preferably 5 μm to 500 μm, and particularly preferably 10 μm to 200 μm.

However, when the phenolic resin foam contains the fine powder reactive with the acid curing catalyst such as a basic ion exchange polymer fine powder, deterioration in the thermal insulation performance over time tends to easily occur and thus the organic fine powder reactive with the acid curing catalyst is preferably not contained in the phenolic resin foam.

The phenolic resin foam in this embodiment may contain a plasticizer and the like in a range that does not affect to the foamability. However, a compound reactive with the acid curing catalyst or a compound that alters by the acid curing catalyst is preferably not contained. For example, when the phenolic resin foam contains the partially hydrolyzed condensation product of an organic silicon compound having a hydrolyzable group such as the partially hydrolyzed condensation product of organo-methoxysilane, the deterioration in the thermal insulation performance over time tends to easily occur and thus the organic silicon compound having a hydrolyzable group is preferably not contained.

The total content of the compound that is reactive with the acid curing catalyst or the compound that alters by the acid curing catalyst is preferably 0.5% by weight or less, more preferably 0.1% by weight or less, and particularly preferably 0.01% by weight or less relative to the phenolic resin foam.

The phenolic resin in this embodiment can be synthesized by polymerization of phenols and aldehydes. The starting molar ratio of the phenols to the aldehydes is preferably in a range of 1:1 to 1:4.5 and more preferably in a range of 1:1.5 to 1:2.5. In this embodiment, examples of the phenols preferably used at the time of phenolic resin synthesis include phenol, resorcinol, catechol, o-, m- and p-cresol, xylenols, ethyl phenols, and p-tert-butylphenol. Bis-phenols can also be used.

Examples of the aldehydes preferably used in this embodiment include formaldehyde, glyoxal, acetaldehyde, chloral, furfural, benzaldehyde, and paraformaldehyde. Urea, dicyandiamide, and melamine can be added as an additive. In this embodiment, when these additives are added, the phenolic resin means a phenolic resin after adding the additive.

The viscosity of the phenolic resin at 40° C. is preferably 200 mPa·s or more and 100,000 mPa·s and less and more preferably 500 mPa·s or more and 50,000 mPa·s or less. The content of water in the phenolic resin is 1% by weight or more and 30% by weight or less.

A method for mixing the inorganic fine powder and/or the organic fine powder with the phenolic resin when the powder is added is not particularly limited and the mixing may be carried out with a mixing machine having a pin mixer or using a twin screw extruder or a kneader. A stage in which the powder is mixed with the phenolic resin is also not particularly limited. The powder may be added with raw materials at the time of the synthesis of the phenolic resin or may be added before or after the addition of each additive after the synthesis. The powder may also be added after adjusting the viscosity or may be added with a surfactant and/or the foaming agent. The viscosity of the entire mixture, however, is increased by adding the powder to the phenolic resin, and thus the viscosity of the phenolic resin is preferably adjusted with content of water and the like while the viscosity is estimated when the powder is added to the phenolic resin before the viscosity adjustment. The powder also may be added to the foamable phenolic resin composition containing a phenolic resin, a surfactant, a foaming agent containing a hydrocarbon, and an acid curing catalyst. The powder may be mixed with the phenolic resin in a required amount or a phenolic resin containing the powder in a high concentration may be prepared as a masterbatch and the masterbatch may be added to the phenolic resin in a required amount.

The viscosity of the phenolic resin containing the powder at 40° C. is preferably 200 mPa·s or more and 300,000 mPa·s or less, more preferably 100,000 mPa·s or less, and further preferably 50,000 mPa·s or less, in consideration of the load of equipment caused by pressure increase in a liquid passage pipe for the foamable phenolic resin composition. The content of water in the phenolic resin is preferably 1% by weight or more and 30% by weight or less.

The phenolic resin foam of this embodiment is obtained from the phenolic resin composition containing at least the phenolic resin, the surfactant, the foaming agent containing cyclopentane and the hydrocarbon having a boiling point of −50° C. to 5° C., and the acid curing catalyst. The surfactant and the foaming agent may be previously added to the phenolic resin or may be added to the phenolic resin at the same time of acid curing catalyst addition.

As the surfactant used in this embodiment, a surfactant generally used for the production of the phenolic resin foam can be used. Among them, a nonionic surfactant is effective. Preferable examples of the nonionic surfactant include an alkylene oxide of a copolymer of ethylene oxide and propylene oxide, a condensation product of an alkylene oxide and castor oil, a condensation product of an alkylene oxide and an alkylphenol such as nonylphenol and dodecylphenol, polyoxyethylene alkyl ethers, fatty acid esters such as polyoxyethylene fatty acid esters, silicone compounds such as ethylene oxide-grafted polydimethylsiloxane, and polyalcohols. The surfactant may be used singly or in combination of two or more of them. The amount used of the surfactant is not particularly limited. The surfactant is preferably used in a range from 0.3 parts by weight to 10 parts by weight relative to 100 parts by weight of the phenolic resin composition.

The acid curing catalyst used in this embodiment is not particularly limited. However, when an acid curing catalyst containing much water is used, the cell walls of the foam may fracture. Consequently, anhydrous phosphoric acid and an anhydrous aryl sulfonic acid are preferable. Examples of the anhydrous aryl sulfonic acid include toluenesulfonic acid, xylenesulfonic acid, phenolsulfonic acid, a substituted phenolsulfonic acid, xylenolsulfonic acid, a substituted xylenolsulfonic acid, dodecylbenzenesulfonic acid, benzenesulfonic acid, and naphthalenesulfonic acid. These anhydrous aryl sulfonic acids can be used singly or in combination of two or more of them. As an auxiliary curing agent, resorcinol, cresol, saligenin (o-methylol phenol), p-methylolphenol, and the like can be added. The acid curing catalyst can be diluted with a solvent such as ethylene glycol and diethylene glycol.

After the acid curing catalyst is added to the phenolic resin, the curing catalyst is uniformly dispersed as quickly as possible with the pin mixer and the like. The amount used of the foaming agent varies depending on the viscosity, the content of water, and the foaming and curing temperature of the phenolic resin. The foaming agent is preferably used in an amount of 1 part by weight or more and 25 parts by weight, and more preferably used in an amount of 3 parts by weight or more and 15 parts by weight or less relative to 100 parts by weight of the phenolic resin.

The amount used of the acid curing catalyst also varies depending on the types thereof. When anhydrous phosphoric acid is used, anhydrous phosphoric acid is preferably used in an amount of 5 parts by weight or more and 30 parts by weight or less and more preferably used in an amount of 8 parts by weight or more and 25 parts by weight or less relative to 100 parts by weight of the phenolic resin. When the mixture of 60% by weight para-toluene sulfonic acid monohydrate and 40% by weight diethylene glycol is used, the mixture is preferably used in an amount of 3 parts by weight or more and 30 parts by weight or less and more preferably used in an amount of 5 parts by weight or more and 20 parts by weight or less relative to 100 parts by weight of the phenolic resin.

The foamable phenolic resin composition of this embodiment is mixed with the mixing machine, discharged from the distribution part, and formed. When the pressure at the distribution part of the mixing machine at the time of discharging the foamable phenolic resin composition from the distribution part of the mixing machine is excessively low, increase in the voids, deterioration in the thermal insulation performance, and tendency of deterioration in the long term thermal insulation performance may occur while when the pressure is excessively high, high pressure-proof facilities are required, and thus facility cost is increased and foam uniformity tends to deteriorate. Therefore, the pressure at the distribution part of the mixing machine is preferably 0.3 MPa or more and 10 MPa or less and more preferably 0.5 MPa or more and 3 MPa or less. The pressure at the distribution part of the mixing machine can be adjusted by a method of controlling the temperature of the mixing machine and/or the distribution part, the diameter of the apex of the distribution part, and the diameter and the length of a pipe attached in a distal part from the distribution part.

In this embodiment, water is preferably included in the foamable phenolic resin composition. Water also contributes to foaming. When the content of water is excessively low, expansion ratio may fail to become high and the initial thermal insulation performance may deteriorate, whereas when the content of water is excessively high, the closed cell ratio may be easily decreased and the long term thermal insulation performance may deteriorate. Consequently, the water at the time of the discharge is preferably controlled. When the measurement of content of water in the discharged product is difficult, the content of water in the foamable phenolic resin composition charged in the mixing machine is preferably adjusted to 2% by weight or more and 20% by weight or less, more preferably adjusted to 2.5% by weight or more and 13% by weight or less, and particularly preferably adjusted to 3% by weight or more and 10% by weight or less. The content of water can be calculated from actual measurement values of each material constituting the composition at the time of charging to the mixing machine The foamable phenolic resin composition discharged from the distribution part of the mixing machine can be pressurized from an upper direction and a lower direction (an upper surface direction and a lower surface direction) to form the foamable phenolic resin composition in the form of a plate by, for example, a method of using a double conveyor, a method of using metal rolls or steel plates, and a method of combining these methods. Among these methods, the method of using the double conveyor is preferable because the obtained plate-like foam has excellent smoothness. When the double conveyor is used, for example, the plate-like phenolic resin foam can be obtained by a method of discharging the foamable phenolic resin composition from the distribution part of the mixing machine onto a moving lower face material, thereafter guiding the foamable phenolic resin composition to the double conveyor while the foamable phenolic resin composition is covered with a moving upper face material, and thereafter pressurizing the foamable phenolic resin composition from the upper direction and the lower direction with heating to foam and to cure the foamable phenolic resin composition with adjusting a predetermined thickness to form a plate-like phenolic resin foam. When the temperature in the double conveyor during the foaming and the curing is excessively low, expansion ratio may fail to become high and thus the initial thermal insulation performance may deteriorate, whereas when the temperature is excessively high, the closed cell ratio may easily decrease and the long term thermal insulation performance may deteriorate. Consequently, the temperature is preferably 60° C. or more and 100° C. or less, more preferably 65° C. or more and 98° C. or less, and further preferably 70° C. or more and 95° C. or less.

In this embodiment, when a coefficient R calculated from the content of water P (% by weight) in the foamable phenolic resin composition charged into the mixing machine described above and the temperature Q (° C.) in the double conveyor during the foaming and the curing described above by the following equation $$R = P + 0.2286Q \qquad (5)$$

is excessively large, the hydrocarbon content Y of the hydrocarbon having a carbon number of 6 or less in the space volume $22.4 \times 10^{-3}$ m$^3$ (22.4 L) in the phenolic resin foam decreases and thus the long term thermal insulation performance may deteriorate, whereas the coefficient R is excessively small, the hydrocarbon content Y of the hydrocarbon having a carbon number of 6 or less in the space volume $22.4 \times 10^{-3}$ m$^3$ (22.4 L) in the phenolic resin foam increases and thus the initial thermal insulation performance may deteriorate. Consequently, the coefficient R is preferably in a range of 20 or more and 36 or less, more preferably in a range of 21.5 or more and 33 or less, and particularly preferably in a range of 23 or more and 29 or less.

The curing temperature in this embodiment is preferably 40° C. or more and 130° C. or less and more preferably 60° C. or more and 110° C. or less. The phenolic resin foam may be cured in one step or may be cured in several steps by changing the curing temperature associated with the degree of curing. For example, the phenolic resin foam can be cured by changing the temperature in the later part of the double conveyor or guiding the foamable phenolic resin composition to a temperature control area that has no double conveyor and changing the temperature of the area.

EXAMPLES

Subsequently, the present invention will be described in detail with reference to Examples and Comparative Examples. However, the present invention is not limited to these Examples and Comparative Examples.

Compositions, structures, and properties of phenolic resins and phenolic resin foams in Examples and Comparative Examples were measured and evaluated as follows.

(1) Foam Density

A phenolic resin foam having a size of 20 cm square was used as a sample. The Foam density is a value obtained by measuring a weight and an apparent volume of the sample from which a face material and a siding material were removed. The value was measured in accordance with JIS-K-7222.

(2) Average Cell Diameter

The average cell diameter was measured in the following method with reference to the method described in JIS-K-6402.

A cutting surface obtained by cutting the substantially center part of a phenolic resin foam in a thickness direction in parallel with the front and back surfaces was photographed at a magnification of 50. On the obtained photograph, four straight lines having a length of 9 cm (corresponding to 1,800 μm in the actual foam cross-sectional surface) were drawn and an average value of the number of cells that each straight line crossed was determined. The average cell diameter is a value determined by dividing 1,800 μm by the average value of the number of cells that each straight line crossed.

(3) Closed cell ratio

The closed cell ratio was measured in the following method with reference to Method A in ASTM-D-2856-94 (1998).

A cubic test specimen having a size of about 25 mm cube was cut out from the center part in the thickness direction of the foam. When a test specimen having an equal thickness of 25mm cube cannot be obtained due to a thin sample, a test specimen having the equal thickness is formed by slicing every surfaces of the cubic test specimen having a size of about 25 mm cube by about 1 mm. The length of each side of the test specimen was measured by a caliper and an apparent volume (V1: cm$^3$) was measured and the weight (W: four significant digits, g) of the test specimen were measured. Subsequently, a closed space volume (V2: cm$^3$) of the test specimen was measured with an air pycnometer (TOKYO SCIENCE CO., LTD, trade name "MODEL 1000") in accordance with the method described in Method A in ASTM-D-2856. A cell diameter (t: cm) was measured in accordance with the measurement method in "(2) Average cell diameter" described in this application, and a surface area (A: cm$^3$) of the test specimen was determined from the lengths of each side that are previously measured. From t and A, an opening cell volume (VA: cm$^3$) of cut cells in the test specimen surface was calculated by the equation VA=(A×t)/1.14. The density of the solid phenolic resin was determined as 1.3 g/ml and a solid part volume (VS: cm$^3$) constituting the cell walls contained in the test specimen was calculated by the equation VS=Test specimen weight (W)/1.3.

The closed cell ratio was calculated by the following equation.

$$\text{Closed cell ratio (\%)} = [(V2-VS)/(V1-VA-VS)] \times 100 \quad (6)$$

The foam samples made by the same production conditions were measured 6 times and the average value of the measured values was determined as a representative value of the production condition sample.

(4) Void Area Ratio

The 100×150 mm region of the cutting surface obtained by cutting the substantially center part of the phenolic resin foam in a thickness direction in parallel with the front and back surfaces was magnified to 200% by photography or color-copy. In the captured photograph or the copy drawing, each of the vertical and horizontal lengths is two times the actual lengths and the area is four times the actual area. A transparent graph paper was overlapped on the photograph or the drawing. A large cell is selected and a cross-sectional area of the cell was measured using grids in the graph paper. A pore containing eight continuous squares or more in the image was determined as a void, where a square has as size of 1 mm×1 mm. The observed void areas were integrated to calculate the area ratio. In other words, these 8 squares are corresponding to 2 mm$^2$ in the actual foam cross-sectional surface because the image was copied in a magnified manner. The foam samples made by the same production conditions were measured 12 times and the average value of the measured values was determined as a representative value of the production condition sample.

(5) Thermal Conductivity

The thermal conductivities at 10° C. and 23° C. were measured in the following method in accordance with the method described in JIS A 1412-2: 1999.

The phenolic resin foam sample was cut into about 600 mm square. The test specimen was placed in an atmosphere at 23±1° C. in a humidity of 50±2% and change in weight over time was measured every 24 hours. The conditions were controlled until the weight change over 24 hours is 0.2% by weight or less. The condition controlled test specimen was introduced into a thermal conductivity meter placed in the same environment. When the thermal conductivity measurement meter was not placed in the room where the test specimen was placed and the environment was controlled at 23±1° C. in a humidity of 50±2%, the test specimen was quickly put into a polyethylene bag and the bag was closed. The test specimen was taken out from the bag within 1 hour and the test specimen was quickly subjected to the measurement of the thermal conductivity.

After the face material was peeled so that the foamed part was not damaged, the thermal conductivity was measured under conditions of a lower temperature plate of 0° C. and a higher temperature plate of 20° C. in the case of the thermal conductivity at 10° C. and under conditions of a lower temperature plate of 13° C. and a higher temperature plate of 33° C. in the case of the thermal conductivity at 23° C. Each of the thermal conductivities was measured with a measurement meter of a single test specimen—symmetric configuration method (EKO Instruments, trade name "HC-074/600").

(6) Thermal Conductivity after Acceleration Test

With reference to EN13166, the thermal conductivity of the test specimen that was left to stand under the following conditions, which was assumed that the test specimen was aged for 25 years, was measured.

The phenolic resin foam sample was cut into about 600 mm square. In the case of a foam having face material that permeates gas, the foam was used as a test specimen with the face material, whereas in the case of a foam having a face material that does not permeates gas, the face material was peeled so that the foam part was not damaged in order to evaluate properties of the foam itself and used as a test specimen. The test specimen was subjected to the acceleration test.

The test specimen of 600 mm square was left to stand in an oven with internal air circulation in which the temperature was controlled at 110±2° C. for 14±0.05 days to carry out the acceleration test.

Subsequently, the thermal conductivities at 10° C. and 23° C. were measured in accordance with the measurement method in "(5) Thermal conductivity".

(7) Content of Water in Phenolic Resin Composition

The content water in the composition itself is difficult to measure. Therefore, contents of water in each component constituting the composition were measured and the content of water in the composition was calculated as a weighted average of each moisture content in proportion as mixed ratios.

(A) Content of Water in Phenolic Resin

To anhydrous methanol (manufactured by Kanto Chemical Co., Ltd.) whose content of water was measured, the phenolic resin was dissolved in a range of 3% by weight to 7% by weight. The content of water in the phenolic resin was determined by subtracting the content of water in anhydrous methanol from the moisture content of the solution. The Karl-Fischer moisture meter (manufactured by Kyoto Electronics Manufacturing Co., Ltd., MKC-510) was used for the measurement.

(B) Content of Water in Solid Product

Content of water generated by heating and vaporizing under conditions described below was measured with a Karl-Fischer moisture meter having a boat-type moisture vaporization device.

As the heating temperature, a phenolic resin fine powder and each solid product having low decomposition properties were heated at 110° C. with the moisture vaporization device and the vaporized water was measured, whereas solid products such as hydrates that were decomposed by heating at high temperature and generated water were heated to a temperature lower than the decomposition temperature and the contained water was vaporized.

(C) Content of Water in Liquid

The content of water in a liquid was measured with a Karl-Fischer moisture meter. When the liquid product had high viscosity, the liquid product was dissolved into anhydrous methanol (manufactured by Kanto Chemical Co., Ltd.) whose content of water was measured. The content of water in the liquid product was determined by subtracting the content of water in anhydrous methanol from the content of water in the solution. The Karl-Fischer moisture meter (manufactured by Kyoto Electronics Manufacturing Co., Ltd., MKC-510) was used for the measurement.

(D) Content of Water in Low Boiling Point Liquid and Liquefied Gas

For a low boiling point liquid and a liquefied gas whose content of water were difficult to measure by the method in (c), the contained content of water was determined by measuring with a Karl-Fischer moisture meter having a liquefied gas vaporization device.

(E) Content of Water in Other Materials

As the contents of water in additives (such as a surfactant, an acid curing catalyst, a foaming agent, and a powder), analyzed values of contents of water measured by the manufacturers may be used. When the analyzed value measured by the manufacturer was insufficient, for example analyzed values measured by the manufactures were not available, the contents of water were measured in accordance with the methods described above.

(8) Content of Material Having a Boiling Point of −100° C. To 81° C. Contained in Foam 10 g of foam sample from which the face material was peeled and a metal file were placed in a 10 L container (product name Tedlar Bag). The container was sealed and 5 L of nitrogen was filled. The sample was grinded and finely pulverized using the file through the Tedlar Bag. Subsequently, the Tedlar Bag was placed in an oven in which the temperature was controlled at 81° C. for 10 minutes. The gas generated in the Tedlar Bag was collected in a volume of 100 μL and the collected gas was measured by GC/MS to analyze the type and the composition ratio of the generated gas components.

Separately, the detection sensitivities of the generated gas components were measured and composition ratio was calculated from the detected region area and detection sensitivity obtained from GC/MS measurement of each gas component.

(9) Content of Hydrocarbon Having a Carbon Number of 6 or Less in Foam

The phenolic resin foam sample was cut into about 100 mm square to prepare 6 test specimen and 6 bags with zipper that was able to be sealed and had heat resistance (hereinafter, abbreviated as a bag with zipper) were prepared. The weights of each bag were measured with a precision balance. The test specimen was placed in an oven with internal air circulation in which the temperature was controlled at 70° C. for 24±0.5 hours to evaporate the water and thereafter the test specimen was quickly placed in the bag with zipper. The bag was sealed and the test specimen was cooled to room temperature. After being cooled to room temperature, the test specimen was taken out from the bag with zipper and the face material of the test specimen was quickly peeled. The weight (W1) of each test specimen was measured with the precision balance and the lengths of each side were measured with a caliper to calculate the volume (V) of the test specimen. Thereafter, each test specimen was placed again in the bag with zipper. The bag with zipper was sealed again while remaining the part of the opening and was inserted between the plates of a hydraulic press of room temperature and gradually compressed to a pressure of about 200 N/cm$^2$ to break the cells of the test specimen. A part of the test specimen was collected from three test specimens and the contained content of water was measured by the measurement method of the content of water in the solid product. Subsequently, the remaining test specimens in each bags with zipper while remaining the part of the opening were placed in an oven with internal air circulation in which the temperature was controlled at 81° C. for 30±5 minutes. Thereafter, the gas in the bag was immediately discharged so that the powder did not go out from the bag. Then, the bag was sealed and the test specimens were cooled to room temperature. After the test specimens were cooled to room temperature, the weight of the bag with zipper in which the test specimen not used for the content of water measurement was placed was measured with a precision balance. The weight of the bag with zipper was subtracted from the measured weight to determine the weight (W2) of the test specimens from which the volatile components were removed. At the same time, a part of the test specimen was collected from the three bags containing the test specimen for the measurement of the content of water described above and content of water was measured in a similar manner.

The content of the hydrocarbon having a carbon number of 6 or less in the foam was determined as follows. The difference of the difference of the content of water was subtracted from the difference of W1 and W2 and a volatile component weight (W3) was determined by adding an air buoyancy weight calculated from a volume (space volume in the foam) determined by subtracting a resin volume calculated from W2 with determining the solid phenolic resin density as 1.3 g/cm$^3$ from the test specimen volume (V) and the air density (0.00119 g/mL) A contained weight (W4) was calculated by multiplying W3 by the ratio in the gas component of the hydrocarbon having a carbon number of 6 or less measured in the measurement method (8) in this application.

The content (mol/22.4×10$^{-3}$ m$^3$) of the hydrocarbon having a carbon number of 6 or less in the foam was calculated from W4, the measured amount of the hydrocarbon measured in the measurement method (8) in this application in a space volume of 22.4×10$^{-3}$ m$^3$, and the molecular weight.

(10) Viscosity of Phenolic Resin

The viscosity of the phenolic resin was determined as a value measured after stabilizing for 3 minutes at 40° C. with the rotation viscometer (manufactured by TOKI SANGYO CO., LTD., Type R-100, rotor part: 3° x R-14). The viscosity of the foamable phenolic resin composition at the time of forming in a plate-like shape was determined as a value measured after 2 minutes at 40° C. with the rotation viscometer in order to evaluate the viscosity with elimination of the viscosity increase effect caused by curing of the resin as much as possible.

(11) Average Particle Diameter of Powder

The average particle diameter of the powder was measured with the diffracted laser light scattering type particle size distribution measuring apparatus (manufactured by Nikkiso Co., LTD., Microtrac HRA; 9320-X100) and was measured after ultrasonic treatment for 1 minute for uniformly dispersing the powder in water.

Example 1

To a reactor, 3500 kg of 52% by weight formaldehyde and 2510 kg of 99% by weight phenol were charged and the mixture was stirred using a propeller rotating stirrer. The temperature of the liquid in the reactor was adjusted to 40° C. using a temperature controller. Subsequently, the temperature was raised to carry out the reaction, while 50% by weight aqueous sodium hydroxide solution was added. At the stage where an Ostwald viscosity reached to 60 centistokes (a measured value at 25° C.), the reaction liquid was cooled and then 570 kg of urea (corresponding to 15 mol % of the amount of charged formaldehyde) was added. Thereafter, the reaction liquid was cooled to 30° C. and the pH of the reaction liquid was neutralized to 6.4 with 50% by weight aqueous solution of p-toluenesulfonic acid monohydrate.

The reaction liquid was dehydrated at 60° C. The content of water was 6.7% by weight.

Relative to 100 parts by weight of the reaction liquid after dehydration, the block copolymer of ethylene oxide-propylene oxide as a surfactant (manufactured by BASF, Pluronic F-127) was mixed in a ratio of 2.5 parts by weight. This was determined to be Phenolic resin A.

Figure 1:
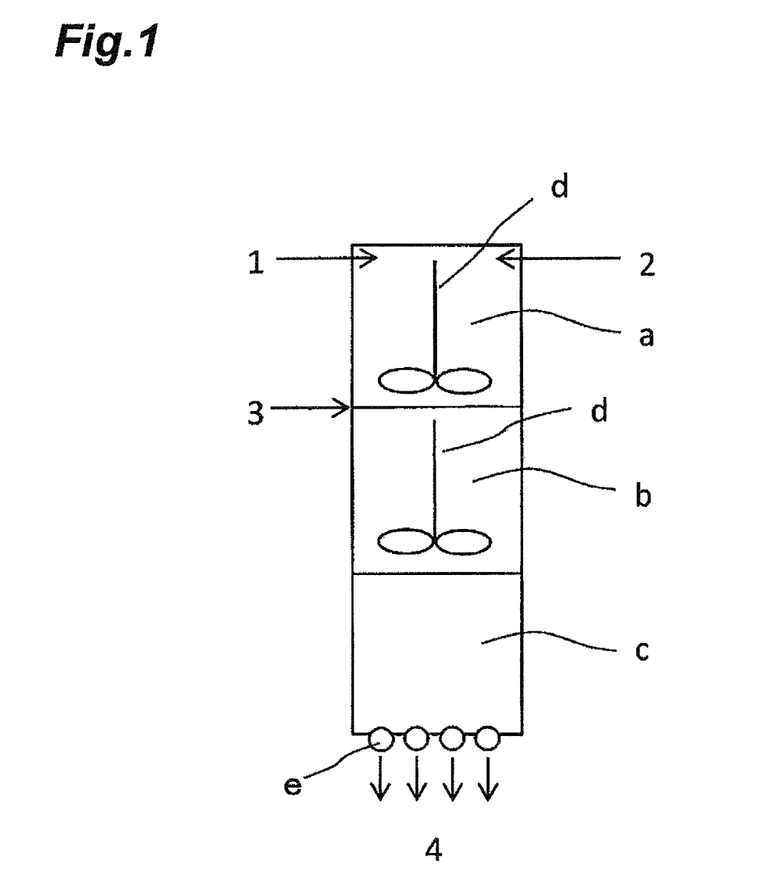
FIG. 1 is an example of a schematic view of a mixing machine used in one embodiment of the present invention.

Relative to 100 parts by weight of Phenolic resin A, a composition containing 100 parts of the phenolic resin A and 4.7 parts by weight of the mixture containing 87 mol % of cyclopentane and 13 mol % of isobutane as a foaming agent and 11 parts by weight of the mixture containing 80% by weight of xylenesulfonic acid and 20% by weight of diethylene glycol as an acid curing catalyst was fed to a mixing head in which the temperature was controlled at 25° C. and fed onto a moving lower face material through a multiport distribution pipe. The mixing machine (mixer) used is illustrated in FIG. 1. The mixing machine is a mixing machine that enlarges the machine disclosed in Japanese Patent Application Laid-Open Publication No. 10-225993 and the number of nozzles of the disclosed machine is increased. In other words, inlets for the resin composition 1 in which the surfactant is added to the phenolic resin and the foaming agent 2 are located in the upper part of the side face. The mixing machine provides the inlet of the curing catalyst 3 in the side face close to the center of the stirring part where a rotator d stirs. The later part from the stirring part is connected to a nozzle for discharging foam. A part to the catalyst inlet is defined as a mixing part (A); a part from the catalyst inlet to a stirring end part is defined as a mixing part (B); and a part from the stirring end part to the discharge nozzle is defined as a distribution part (C) and thus the mixing machine is constituted by these parts. The distribution part (C) has a plurality of nozzles at the apex and is designed so that the mixed foamable phenolic resin composition is uniformly distributed. In the distribution part (C), a temperature sensor (D) and a pressure sensor (E) (not illustrated) are provided so as to measure the temperature and the pressure in the system. Each of the mixing parts and the distribution part is covered with a jacket for temperature control in order to be possible to control the temperature. The temperature measured by the temperature sensor (D) was 41.5° C. and the pressure measured by the pressure sensor (E) was 1.0 MPa.

As the face material, the polyester nonwoven cloth (manufactured by Asahi Kasei Fibers Corporation, "Spun-Bond E05030", basis weight 30 g/m$^2$, thickness 0.15 mm) was used.

Figure 2:
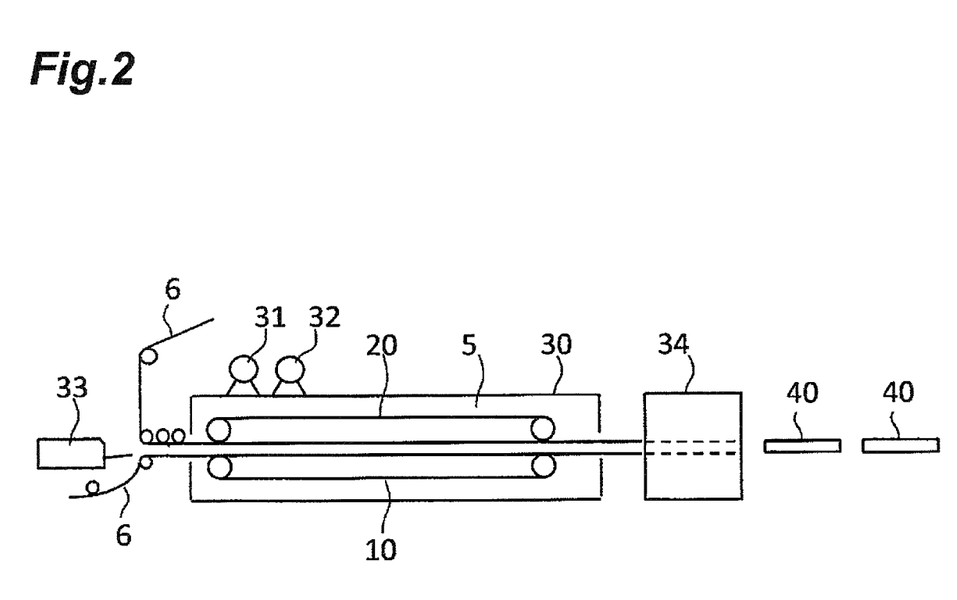
FIG. 2 is an example of a schematic view of a slat type double conveyor used in one embodiment of the present invention.

The foamable phenolic resin composition fed to the lower face material was covered with an upper face material and, at the same time, sent to a slat type double conveyor so as to sandwich with the upper and lower face materials, followed by curing the foamable phenolic resin composition for a residence time of 15 minutes. The slat type double conveyor used is illustrated in FIG. 2. This conveyor is the slat type double conveyor disclosed in Japanese Patent Application Laid-Open Publication No. 2000-218635. In order to measure a double conveyor temperature during foaming and curing, a temperature sensor (F) (not illustrated) is provided at the center between the upper and lower plates of the upper part slat conveyor at the position where the phenolic resin composition passes 3 minutes later after the phenolic resin composition is discharged. The temperature measured by the temperature sensor (F) was 87° C.

Thereafter, a phenolic resin foam having a thickness of 47.5 mm was obtained by curing the foamable phenolic resin composition in an oven at 110° C. for 2 hours. The slat type double conveyor used for the curing was designed so that the water generated during curing can be discharged to the outside. The foamable phenolic resin composition covered with the upper and the lower face materials was formed into plate-like foam by applying appropriate pressure in upper and lower directions by the slat type double conveyor through the face materials.

Example 2

A phenolic resin foam having a thickness of 48.5 mm was obtained in the same method as the method in Example 1 except that the foaming agent was replaced to a foaming agent of 4.8 parts by weight of a mixture containing 82 mol % of cyclopentane and 18 mol % of isobutane relative to 100 parts by weight of the phenolic resin. The temperature measured by the temperature sensor (D) was 40.7° C. and the pressure measured by the pressure sensor (E) was 1.0 MPa.

Example 3

A phenolic resin foam having a thickness of 49.5 mm was obtained in the same method as the method in Example 1 except that the foaming agent was replaced to a foaming agent of 4.8 parts by weight of a mixture containing 75 mol % of cyclopentane and 25 mol % of isobutane relative to 100 parts by weight of phenolic resin. The temperature measured by the temperature sensor (D) was 40.5° C. and the pressure measured by the pressure sensor (E) was 1.1 MPa.

Example 4

A phenolic resin foam having a thickness of 48.2 mm was obtained in the same method as the method in Example 1 except that the foaming agent was replaced to a foaming agent of 4.8 parts by weight of a mixture containing 68 mol % of cyclopentane and 32 mol % of isobutane relative to 100 parts by weight of the phenolic resin and the double conveyor temperature measured by the temperature sensor (F) and the residence time in the slat type double conveyor were changed to 83° C. and 20 minutes, respectively. The temperature measured by the temperature sensor (D) was 40.1° C. and the pressure measured by the pressure sensor (E) was 1.1 MPa.

Example 5

A phenolic resin foam having a thickness of 49.1 mm was obtained in the same method as the method in Example 4 except that foaming agent was added in an amount of 3.6 parts by weight relative to 100 parts by weight of the phenolic resin prepared in the same method as the method in Example 1 except that the dehydration conditions alone were different and the content of water was 9.5% by weight and the double conveyor temperature measured by the temperature sensor (F) and the residence time in the slat type double conveyor were changed to 93° C. and 15 minutes, respectively. The temperature measured by the temperature sensor (D) was 40.1° C. and the pressure measured by the pressure sensor (E) was 0.8 MPa.

Example 6

A phenolic resin foam having a thickness of 48.8 mm was obtained in the same method as the method in Example 5 except that the foaming agent was added in an amount of 3.8 parts by weight relative to 100 parts by weight of the phenolic resin was used and the double conveyor temperature measured by the temperature sensor (F) and was changed to 90° C. The temperature measured by the temperature sensor (D) was 40.2° C. and the pressure measured by the pressure sensor (E) was 0.8 MPa.

Example 7

A phenolic resin foam having a thickness of 47.3 mm was obtained in the same method as the method in Example 4 except that the foaming agent was added in an amount of 6.1 parts by weight relative to 100 parts by weight of the phenolic resin prepared in the same method as the method in Example 1 except that the dehydration conditions alone were different and the content of water was 4.6% by weight and the double conveyor temperature measured by the temperature sensor (F) was changed to 80° C. The temperature measured by the temperature sensor (D) was 40.1° C. and the pressure measured by the pressure sensor (E) was 1.3 MPa.

Example 8

A phenolic resin foam having a thickness of 48.3 mm was obtained in the same method as the method in Example 7 except that the foaming agent was added in an amount of 7.8 parts by weight relative to 100 parts by weight of the phenolic resin and the double conveyor temperature measured by the temperature sensor (F) and the residence time of the slat type double conveyor were changed to 75° C. and 25 minutes, respectively. The temperature measured by the temperature sensor (D) was 40.1° C. and the pressure measured by the pressure sensor (E) was 1.4 MPa.

Example 9

A phenolic resin foam having a thickness of 48.6 mm was obtained in the same method as the method in Example 7 except that the foaming agent was added in an amount of 6.5 parts by weight relative to 100 parts by weight of the phenolic resin and the double conveyor temperature measured by the temperature sensor (F) and the residence time of the slat type double conveyor were changed to 83° C. and 20 minutes, respectively. The temperature measured by the temperature sensor (D) was 40.2° C. and the pressure measured by the pressure sensor (E) was 1.3 MPa.

Example 10

A phenolic resin foam having a thickness of 49.8 mm was obtained in the same method as the method in Example 7 except that the foaming agent was replaced to a foaming agent of 6.7 parts by weight of a mixture containing 68 mol % of cyclopentane and 32 mol % of normal-butane relative to 100 parts by weight of the phenolic resin and the double conveyor temperature measured by the temperature sensor (F) and the residence time in the slat type double conveyor were changed to 75° C. and 25 minutes, respectively. The temperature measured by the temperature sensor (D) was 40.4° C. and the pressure measured by the pressure sensor (E) was 1.3 MPa.

Example 11

A phenolic resin foam having a thickness of 49.2 mm was obtained in the same method as the method in Example 7 except that the foaming agent was added in an amount of 6.5 parts by weight relative to 100 parts by weight of the phenolic resin and the double conveyor temperature measured by the temperature sensor (F) was changed to 83° C. The temperature measured by the temperature sensor (D) was 40.1° C. and the pressure measured by the pressure sensor (E) was 1.4 MPa.

Example 12

A phenolic resin foam having a thickness of 49.8 mm was obtained in the same method as the method in Example 5 except that the foaming agent was replaced to a foaming agent of 3.6 parts by weight of a mixture containing 68 mol % of cyclopentane and 32 mol % of propane relative to 100 parts by weight of the phenolic resin. The temperature measured by the temperature sensor (D) was 39.8° C. and the pressure measured by the pressure sensor (E) was 1.5 MPa.

Example 13

A phenolic resin foam having a thickness of 48.9 mm was obtained in the same method as the method in Example 4 except that the foaming agent was added in an amount of 3.9 parts by weight relative to 100 parts by weight of the phenolic resin and the double conveyor temperature measured by the temperature sensor (F) and the residence time of the slat type double conveyor were changed to 90° C. and 15 minutes, respectively. The temperature measured by the temperature sensor (D) was 40.1° C. and the pressure measured by the pressure sensor (E) was 1.2 MPa.

Example 14

A phenolic resin foam having a thickness of 47.3 mm was obtained in the same method as the method in Example 4 except that the foaming agent was replaced to a foaming agent of 3.6 parts by weight of a mixture made of 45 mol % of cyclopentane and 55 mol % of isopentane relative to 100 parts by weight of the phenolic resin and the double conveyor temperature measured by the temperature sensor (F) was changed to 80° C. The temperature measured by the temperature sensor (D) was 39.7° C. and the pressure measured by the pressure sensor (E) was 1.2 MPa.

Comparative Example 1

A phenolic resin foam having a thickness of 48.7 mm was obtained in the same method as the method in Example 1 except that the foaming agent was replaced to a foaming agent of 4.4 parts by weight of a mixture containing 50 mol % of isopentane and 50 mol % of isobutane relative to 100 parts by weight of the phenolic resin. The temperature measured by the temperature sensor (D) was 37.5° C. and the pressure measured by the pressure sensor (E) was 1.4 MPa.

Comparative Example 2

A phenolic resin foam having a thickness of 49.7 mm was obtained in the same method as the method in Example 1 except that the foaming agent was replaced to a foaming agent of 4.9 parts by weight of a mixture containing 80 mol % of normal-pentane and 20 mol % of isobutane relative to 100 parts by weight of the phenolic resin. The temperature measured by the temperature sensor (D) was 39.5° C. and the pressure measured by the pressure sensor (E) was 1.2 MPa.

Comparative Example 3

A phenolic resin foam having a thickness of 50.3 mm was obtained in the same method as the method in Example 1 except that the foaming agent was replaced to a foaming agent of 5.9 parts by weight of 100 mol % of cyclopentane relative to 100 parts by weight of the phenolic resin. The temperature measured by the temperature sensor (D) was 41.5° C. and the pressure measured by the pressure sensor (E) was 0.8 MPa.

Comparative Example 4

A phenolic resin foam having a thickness of 47.9 mm was obtained in the same method as the method in Example 1 except that the foaming agent was replaced to a foaming agent of 5.4 parts by weight of a mixture containing 68 mol % of cyclopentane and 32 mol % of isopentane relative to 100 parts by weight of the phenolic resin. The temperature measured by the temperature sensor (D) was 40.4° C. and the pressure measured by the pressure sensor (E) was 1.2 MPa.

Comparative Example 5

A phenolic resin foam having a thickness of 47.3 mm was obtained in the same method as the method in Example 1 except that the foaming agent was replaced to a foaming agent of 10 parts by mass of a mixture containing 68 mol % of cyclopentane and 32 mol % of isobutane relative to 100 parts by weight of the phenolic resin and the double conveyor temperature measured by the temperature sensor (F) and the residence time of the slat type double conveyor were changed to 58° C. and 30 minutes, respectively. The temperature measured by the temperature sensor (D) was 39.8° C. and the pressure measured by the pressure sensor (E) was 1.1 MPa.

Comparative Example 6

A phenolic resin foam having a thickness of 49.2 mm was obtained in the same method as the method in Example 1 except that foaming agent was replaced to a foaming agent of 2.4 parts by weight of a mixture containing 68 mol % of cyclopentane and 32 mol % of isobutane relative to 100 parts by weight of the phenolic resin prepared by the same method as the method in Example 1 except that the reaction liquid was cooled at the stage when an Ostwald viscosity reached to 70 centistokes (a measured value at 25° C.) in the synthesis and the content of water was 14.5% due to the different dehydration conditions, and the double conveyor temperature measured by the temperature sensor (F) was changed to 96° C. The temperature measured by the temperature sensor (D) was 38.6° C. and the pressure measured by the pressure sensor (E) was 0.8 MPa.

Comparative Example 7

A phenolic resin foam having a thickness of 47.7 mm was obtained in the same method as the method in Example 1 except that the foaming agent was replaced to a foaming agent of 4.5 parts by weight of a mixture containing 25 mol % of cyclopentane and 75 mol % of isobutane relative to 100 parts by weight of the phenolic resin. The temperature measured by the temperature sensor (D) was 39.7° C. and the pressure measured by the pressure sensor (E) was 1.5 MPa.

The evaluation results of the contents of water in the foamable phenolic resin compositions, the cyclopentane contents, the contents of the hydrocarbon of −50° C. to 5° C., and the contents of the hydrocarbon having a carbon number of 6 or less in the obtained phenolic resin foams in Examples and Comparative Examples are listed in Table 1 and the properties and thermal conductivities of the obtained phenolic resin foams are listed in Table 2.

TABLE 1

| | | Foaming and curing conditions | | | | Measured value of obtained foam | | | | |
| --- | --- | --- | --- | --- | --- | --- | --- | --- | --- | --- |
| | Foaming agent | Content of water in resin composition (% by weight) | Temperature of double conveyor (° C.) | Coefficient R | Pressure at distribution part (MPa) | Cyclopentane content (mol %) | Content of hydrocarbon having boiling point of −50° C. to 5° C. (mol %) | Average value of hydrocarbon having a carbon number of 6 or less (° C.) | Content of hydrocarbon having a carbon number of 6 or less (mol/22.4 L) | Coefficient Z |
| Example 1 | Cyclopentane/Isobutane | 5.7 | 87 | 25.6 | 1.0 | 87.5 | 12.5 | 41.7 | 0.52 | 0.78 |
| Example 2 | Cyclopentane/Isobutane | 5.7 | 87 | 25.6 | 1.0 | 82.4 | 17.6 | 38.6 | 0.48 | 0.72 |
| Example 3 | Cyclopentane/Isobutane | 5.7 | 87 | 25.6 | 1.1 | 75.6 | 24.4 | 34.4 | 0.46 | 0.67 |
| Example 4 | Cyclopentane/Isobutane | 5.7 | 83 | 24.7 | 1.1 | 68.7 | 31.3 | 30.2 | 0.54 | 0.73 |
| Example 5 | Cyclopentane/Isobutane | 8.5 | 93 | 29.8 | 0.8 | 68.7 | 31.3 | 30.2 | 0.28 | 0.47 |
| Example 6 | Cyclopentane/Isobutane | 8.5 | 90 | 29.1 | 0.8 | 68.7 | 31.3 | 30.2 | 0.33 | 0.52 |
| Example 7 | Cyclopentane/Isobutane | 3.6 | 80 | 21.9 | 1.3 | 68.6 | 31.4 | 30.1 | 0.74 | 0.93 |
| Example 8 | Cyclopentane/Isobutane | 3.6 | 75 | 20.7 | 1.4 | 68.5 | 31.5 | 30.1 | 0.82 | 1.01 |
| Example 9 | Cyclopentane/Isobutane | 3.6 | 83 | 22.6 | 1.3 | 68.7 | 31.3 | 30.2 | 0.69 | 0.88 |
| Example 10 | Cyclopentane/Normal-butane | 3.6 | 75 | 20.7 | 1.3 | 68.4 | 31.6 | 33.8 | 0.78 | 0.99 |
| Example 11 | Cyclopentane/Isobutane | 3.6 | 83 | 22.6 | 1.4 | 58.6 | 41.4 | 24.0 | 0.62 | 0.77 |
| Example 12 | Cyclopentane/Propane | 8.5 | 93 | 29.8 | 1.5 | 58.8 | 41.2 | 11.6 | 0.31 | 0.38 |
| Example 13 | Cyclopentane/Isobutane | 5.7 | 90 | 26.3 | 1.2 | 58.7 | 41.3 | 24.1 | 0.36 | 0.51 |
| Example 14 | Cyclopentane/Isobutane | 5.7 | 80 | 24.0 | 1.2 | 45.7 | 54.3 | 16.2 | 0.52 | 0.62 |
| Comparative Example 1 | Isopentane/Isobutane | 5.7 | 87 | 25.6 | 1.4 | 0 | 49.7 | 8.2 | 0.44 | 0.49 |
| Comparative Example 2 | Normal-pentane/Isobutane | 5.7 | 87 | 25.6 | 1.2 | 0 | 19.7 | 26.7 | 0.45 | 0.62 |
| Comparative Example 3 | Cyclopentane | 5.6 | 87 | 25.5 | 0.8 | 100 | 0 | 49.3 | 0.55 | 0.86 |
| Comparative Example 4 | Cyclopentane/isopentane | 5.7 | 87 | 25.6 | 1.2 | 68.1 | 0 | 42.5 | 0.54 | 0.81 |
| Comparative Example 5 | Cyclopentane/Isobutane | 5.4 | 58 | 18.7 | 1.1 | 68.5 | 31.5 | 30.1 | 1.18 | 1.37 |
| Comparative Example 6 | Cyclopentane/Isobutane | 12.6 | 96 | 34.5 | 0.8 | 69.1 | 30.9 | 30.5 | 0.18 | 0.37 |
| Comparative Example 7 | Cyclopentane/Isobutane | 5.7 | 87 | 25.6 | 1.5 | 25.8 | 74.2 | 4.0 | 0.43 | 0.46 |

TABLE 2

| | Foam density (kg/cm³) | Closed cell ratio (%) | Average cell diameter (μm) | Area ratio of voids (%) | Initial thermal conductivity (W/m·K) | | Thermal conductivity after heating at 110° C. for 14 days (W/m·K) | |
| --- | --- | --- | --- | --- | --- | --- | --- | --- |
| | | | | | 10° C. | 23° C. | 10° C. | 23° |
| Example 1 | 33.2 | 98.6 | 127 | 0.06 | 0.0189 | 0.0189 | 0.0193 | 0.0192 |
| Example 2 | 29.5 | 98.7 | 115 | 0.05 | 0.0183 | 0.0186 | 0.0186 | 0.0190 |
| Example 3 | 28.5 | 99.2 | 107 | 0.03 | 0.0173 | 0.0182 | 0.0175 | 0.0185 |
| Example 4 | 32.2 | 98.9 | 105 | 0.04 | 0.0173 | 0.0183 | 0.0175 | 0.0186 |
| Example 5 | 24.3 | 96.7 | 118 | 0.08 | 0.0172 | 0.0184 | 0.0183 | 0.0194 |
| Example 6 | 26.2 | 97.7 | 120 | 0.07 | 0.0172 | 0.0183 | 0.0177 | 0.0188 |
| Example 7 | 33.1 | 99.1 | 103 | 0.03 | 0.0179 | 0.0184 | 0.0181 | 0.0186 |
| Example 8 | 29.3 | 99.3 | 98 | 0.04 | 0.0183 | 0.0185 | 0.0185 | 0.0187 |
| Example 9 | 29.8 | 98.9 | 102 | 0.03 | 0.0175 | 0.0183 | 0.0177 | 0.0186 |
| Example 10 | 32.8 | 98.3 | 108 | 0.06 | 0.0182 | 0.0186 | 0.0184 | 0.0189 |
| Example 11 | 27.0 | 98.9 | 95 | 0.02 | 0.0174 | 0.0187 | 0.0177 | 0.0190 |

TABLE 2-continued

|  | Foam density (kg/cm³) | Closed cell ratio (%) | Average cell diameter (μm) | Area ratio of voids (%) | Initial thermal conductivity (W/m · K) | | Thermal conductivity after heating at 110° C. for 14 days (W/m · K) | |
|---|---|---|---|---|---|---|---|---|
|  |  |  |  |  | 10° C. | 23° C. | 10° C. | 23° |
| Example 12 | 24.5 | 97.7 | 84 | 0.08 | 0.0177 | 0.0192 | 0.0187 | 0.0201 |
| Example 13 | 26.9 | 98.8 | 102 | 0.04 | 0.0175 | 0.0189 | 0.0181 | 0.0194 |
| Example 14 | 38.6 | 99.3 | 98 | 0.03 | 0.0176 | 0.0190 | 0.0178 | 0.0193 |
| Comparative Example 1 | 29.0 | 99.3 | 88 | 0.02 | 0.0191 | 0.0205 | 0.0199 | 0.0213 |
| Comparative Example 2 | 28.2 | 98.7 | 102 | 0.05 | 0.0186 | 0.0200 | 0.0193 | 0.0206 |
| Comparative Example 3 | 28.3 | 98.2 | 155 | 0.09 | 0.0215 | 0.0204 | 0.0216 | 0.0207 |
| Comparative Example 4 | 30.1 | 98.3 | 131 | 0.08 | 0.0214 | 0.0206 | 0.0217 | 0.0209 |
| Comparative Example 5 | 32.4 | 98.8 | 103 | 0.03 | 0.0221 | 0.0207 | 0.0223 | 0.0209 |
| Comparative Example 6 | 26.1 | 93.6 | 127 | 0.11 | 0.0169 | 0.0184 | 0.0206 | 0.0221 |
| Comparative Example 7 | 26.1 | 97.6 | 75 | 0.05 | 0.0194 | 0.0209 | 0.0202 | 0.0216 |

INDUSTRIAL APPLICABILITY

According to the present invention, a phenolic resin foam having low initial thermal conductivity and retention of low thermal conductivity for a long period and a method for producing the same can be provided. Therefore, the phenolic resin foam of the present invention can be preferably used for a thermal-insulating material for construction, a thermal-insulating material for vehicles, and a thermal-insulating material for devices.

REFERENCE SIGNS LIST

1 . . . Phenolic resin, 2 . . . Foaming agent, 3 . . . Curing catalyst, 4 . . . Discharged phenolic resin composition, 5 . . . Molding apparatus, 6 . . . Face material, 10 . . . Lower part slat conveyor, 20 . . . Upper part slat conveyor, 30 . . . Heat-retaining material, 31 . . . Air charge fan, 32 . . . Exhaust fan, 33 . . . Mixing machine, 34 . . . Cutting device, 40 . . . Panel-like phenolic resin foam, a . . . Mixing part (A), b . . . Mixing part (B), c . . . Distribution part (C), d . . . Rotor for stirring, e . . . Nozzle for discharge

The invention claimed is:

1. A phenolic resin foam comprising a hydrocarbon component, and having a density of 10kg/m³ to 150kg/m³, wherein
in the phenolic resin foam, the hydrocarbon component comprises 40 mol % to 90 mol % of cyclopentane and 60 mol % to 10 mol % of one or more types selected from hydrocarbons different than cyclopentane that have a carbon number of 6 or less and a boiling point of −50° C. to 5° C.,
the average boiling point X of the hydrocarbon component is 5° C. to 44° C. and the content Y of the hydrocarbon component in the phenolic resin foam is 0.25 mol to 0.70 mol per 22.4×10⁻³ m³ of space volume contained within the phenolic resin foam, and
the thermal conductivity measured at 10° C. and the thermal conductivity measured at 23° C. of the phenolic resin foam are less than 0.0205W/m·K.

2. The phenolic resin foam according to claim 1, wherein a coefficient Z is a number from 0.4 to 1.10 when calculated using the following equation (1):

$$Z = 0.0063X + Y \qquad (1).$$

3. The phenolic resin foam according to claim 1, having:
a closed cell ratio of 90% or more;
an average cell diameter of 40 μm to 300 μm; and
a void area ratio of 0.2% or less.

4. The phenolic resin foam according to claim 1, wherein the hydrocarbon having a boiling point of −50° C. to 5° C. contains isobutane.

5. The phenolic resin foam according to claim 1, wherein the total amount of cyclopentane and the hydrocarbon having a boiling point of −50° C. to 5° C. among substances having a boiling point of −100° C. to 81° C. contained in the phenolic resin foam is 70 mol % to 100 mol %.

6. The phenolic resin foam according to claim 1, wherein the total content of compounds having reactivity with an acid curing catalyst or compounds which are altered by the acid curing catalyst is 0.5% by weight or less relative to the phenolic resin foam.

7. A method for producing the phenolic resin foam according to claim 1, comprising:
mixing a foamable phenolic resin composition containing a phenolic resin, a surfactant, a foaming agent including cyclopentane and a hydrocarbon having a boiling point of −50° C. to 5° C., and an acid curing catalyst with a mixing machine;
discharging the foamable phenolic resin composition from a distribution part of the mixing machine; and then
pressurizing an upper surface and a lower surface of the foamable phenolic resin composition while foaming and curing the foamable phenolic resin composition by heating to produce a phenolic resin foam molded in the form of a plate.

8. The method according to claim 7, wherein the pressure in the distribution part is 0.3 MPa or more and 10 MPa or less.

9. The method according to claim 7, wherein
water is contained in the foamable phenolic resin composition to be mixed with the mixing machine in an amount of 2% by weight to 20% by weight, and foaming and curing is performed in a double conveyor at a temperature of 60° C. to 100° C.

10. The method according to claim 9, wherein
a coefficient R is a number from 20 to 36 when calculated from the content of water P in percentage by weight of the foamable phenolic resin composition and the temperature Q in ° C. in the double conveyor using the following equation (2):

$$R = P + 0.2286Q \qquad (2).$$

11. The phenolic resin foam according to claim 1, wherein the average boiling point X of the hydrocarbon component is 15 to 37° C.

* * * * *